US012569086B2

(12) United States Patent
Balzani

(10) Patent No.: US 12,569,086 B2
(45) Date of Patent: Mar. 10, 2026

(54) COFFEE MAKER WITH FOAMING DEVICE

(71) Applicant: BIALETTI INDUSTRIE S.P.A., Coccaglio (IT)

(72) Inventor: Moreno Balzani, Coccaglio (IT)

(73) Assignee: BIALETTI INDUSTRIE S.P.A., Coccaglio (IT)

( * ) Notice: Subject to any disclaimer, the term of this patent is extended or adjusted under 35 U.S.C. 154(b) by 854 days.

(21) Appl. No.: 17/791,243

(22) PCT Filed: Jan. 13, 2021

(86) PCT No.: PCT/IB2021/050203
§ 371 (c)(1),
(2) Date: Jul. 7, 2022

(87) PCT Pub. No.: WO2021/144697
PCT Pub. Date: Jul. 22, 2021

(65) Prior Publication Data
US 2023/0346155 A1 Nov. 2, 2023

(30) Foreign Application Priority Data
Jan. 16, 2020 (IT) ........................ 102020000000736

(51) Int. Cl.
*A47J 31/44* (2006.01)
*A47J 31/30* (2006.01)

(52) U.S. Cl.
CPC ......... *A47J 31/4496* (2013.01); *A47J 31/303* (2013.01)

(58) Field of Classification Search
CPC ...... A47J 31/4496; A47J 31/303; A47J 31/02; A47J 31/4482; A47J 31/4485; A47J 31/60; A47J 31/469; A47J 31/061; A47J 45/10; A47J 36/10

USPC ........................... 99/279, 290, 293, 295, 323
See application file for complete search history.

(56) References Cited

U.S. PATENT DOCUMENTS

2008/0229933 A1* 9/2008 Morin ................. A47J 31/4496
99/302 R

FOREIGN PATENT DOCUMENTS

| EP | 1797360 A1 | 6/2007 |
| EP | 1813173 A1 | 8/2007 |
| EP | 3247245 A1 | 11/2017 |
| GB | 2436280 A | 9/2007 |
| WO | 03055366 A2 | 7/2003 |
| WO | 03056986 A1 | 7/2003 |
| WO | 2008087481 A1 | 7/2008 |

(Continued)

OTHER PUBLICATIONS

International Search Report, issued in PCT/IB2021/050203, mailed Apr. 7, 2021, Rijswijk, NL.

*Primary Examiner* — Phuong T Nguyen
(74) *Attorney, Agent, or Firm* — ArentFox Schiff LLP; Michael Fainberg

(57) ABSTRACT

A coffee maker which has a funnel ending with a funnel mouth and a foaming device applied to the funnel mouth is provided. The foaming device has a valve made of deformable material provided with an outlet mouth towards which an exiting percolated beverage is channeled. In a rest condition, in which the valve does not cooperate with the funnel, the at outlet mouth has a rest passage section. In a mounting condition, in which the valve cooperates with the funnel, the outlet mouth is deformed and has a working passage section, reduced as compared to the rest passage section.

12 Claims, 5 Drawing Sheets

(56)              References Cited

FOREIGN PATENT DOCUMENTS

| WO | 2016113621 | A1 | 7/2016 |
| WO | 2017144996 | A1 | 8/2017 |
| WO | 2019111074 | A1 | 6/2019 |

\* cited by examiner

COFFEE MAKER WITH FOAMING DEVICE

CROSS-REFERENCE TO RELATED APPLICATIONS

This application is a National Phase Application of PCT International Application No. PCT/IB2021/050203, having an International Filing Date of Jan. 13, 2021 which claims priority to Italian Application No. 102020000000736 filed Jan. 16, 2020, each of which is hereby incorporated by reference in its entirety.

FIELD OF THE INVENTION

The present invention relates to a coffee maker capable of making a beverage having a particularly dense and compact foam.

BACKGROUND OF THE INVENTION

As is known, the conventional coffee maker, more commonly known as a "mocha", manufactured by the Applicant since the early 1900s, is very common worldwide and almost 2 million are still sold per year, despite the success of alternative systems such as single-serve capsule ones.

Coffee maker users are generally fond of the aroma of the beverage obtained with this type of coffee maker, which is very different from that which is obtainable with the aforesaid alternative systems.

Nevertheless, there is no doubt that users appreciate any contrivance which allows a beverage having a dense and compact foam to be obtained with a coffee maker, like what occurs with some alternative systems.

Evidence of such an appreciation consists of the efforts that the coffee maker manufacturers have made and still make today to manufacture coffee makers provided with more or less complex devices capable of obtaining a beverage with a dense and compact foam.

Evidence of such efforts is provided by several patent documents disclosing embodiments of such devices, such as for example documents EP-A1-1813173, WO2008/087481, WO2016/113621, WO03/056986, WO03/055366, GB2436280.

However, such devices are often not able to ensure obtaining a beverage with a truly dense and compact foam; moreover, they often are particularly complex to manufacture and are unsuitable for being made in large volumes.

In order to overcome such drawbacks, the Applicant has fine-tuned a coffee maker with foaming device, which features are the subject of International Application WO-A1-2019/111074.

While attempting to push forward the improvement, the Applicant has fine-tuned an alternative foaming device, which is the subject of the present invention, in order to overcome the above drawbacks.

SUMMARY OF THE INVENTION

It is therefore the object of the present invention to provide, in an alternative manner to what is already known, a coffee maker provided with a device which ensures obtaining a beverage with a dense and compact foam, while being affordable and easy to assemble.

Such an object is achieved by a coffee maker as described and claimed herein. Advantageous embodiments of the present invention are also described.

BRIEF DESCRIPTION OF THE FIGURES

The features and advantages of the coffee maker according to the present invention will become apparent from the following description, given by way of a non-limiting example, according to the accompanying drawings, in which.

DETAILED DESCRIPTION

Figure 1:
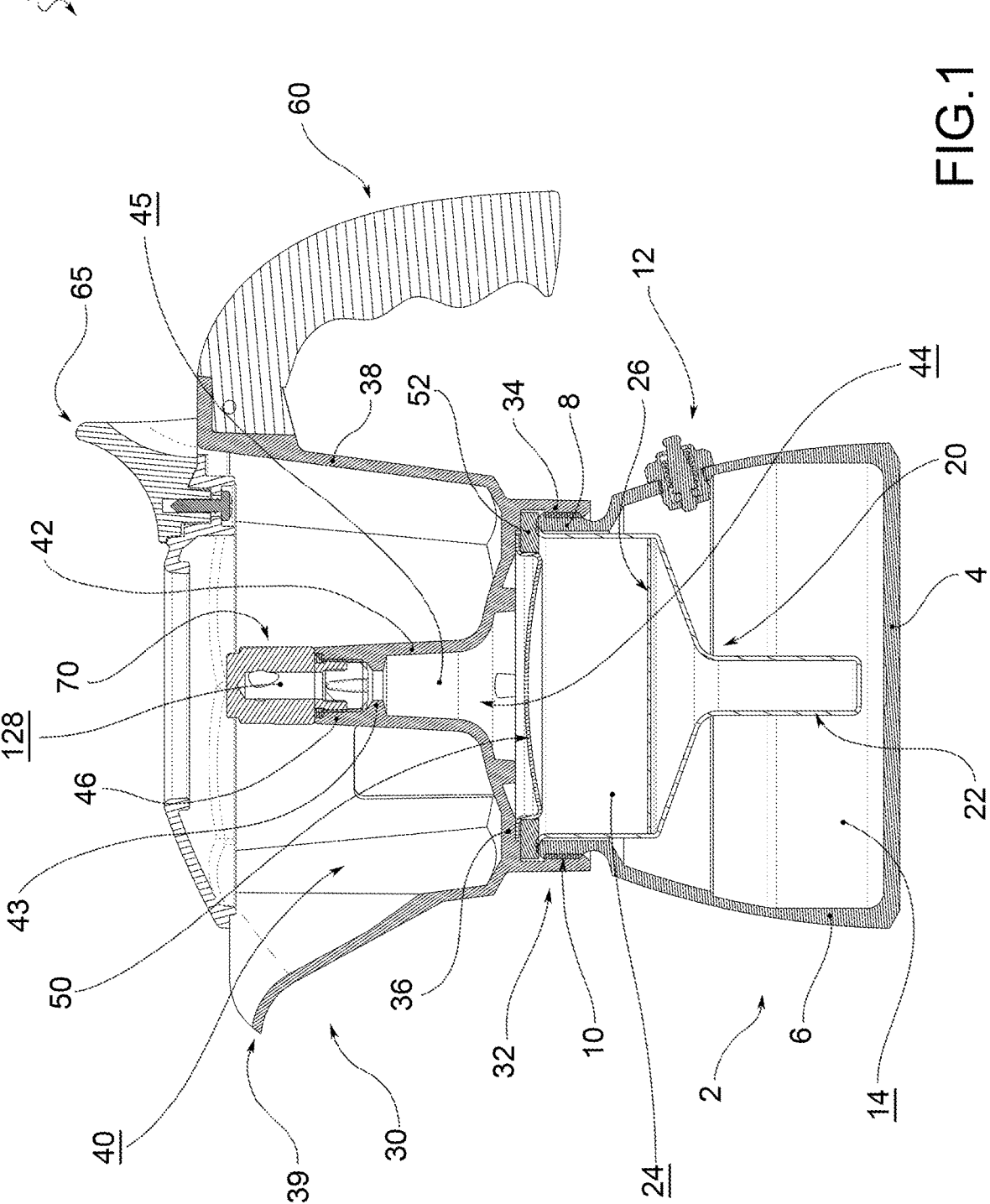
FIG. 1 shows a coffee maker according to an embodiment of the present invention.
Figure 2A:
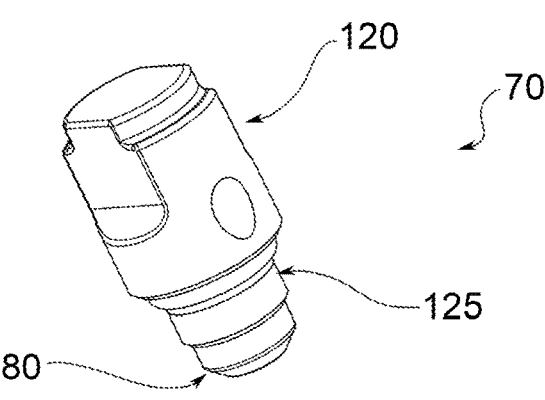
FIGS. 2a, 2b and 2c show a foaming device according to an embodiment of the present invention.
Figure 2B:
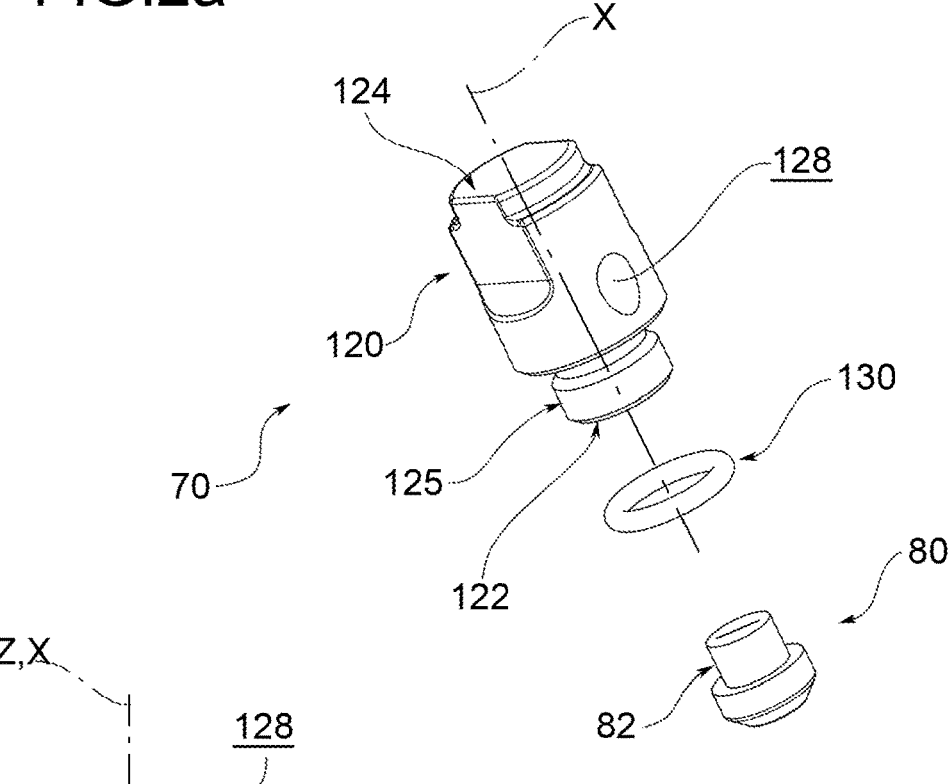
Figure 2C:
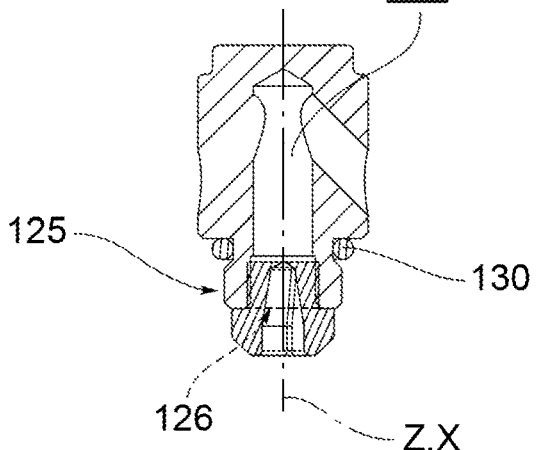
Figures 3A, 3B:
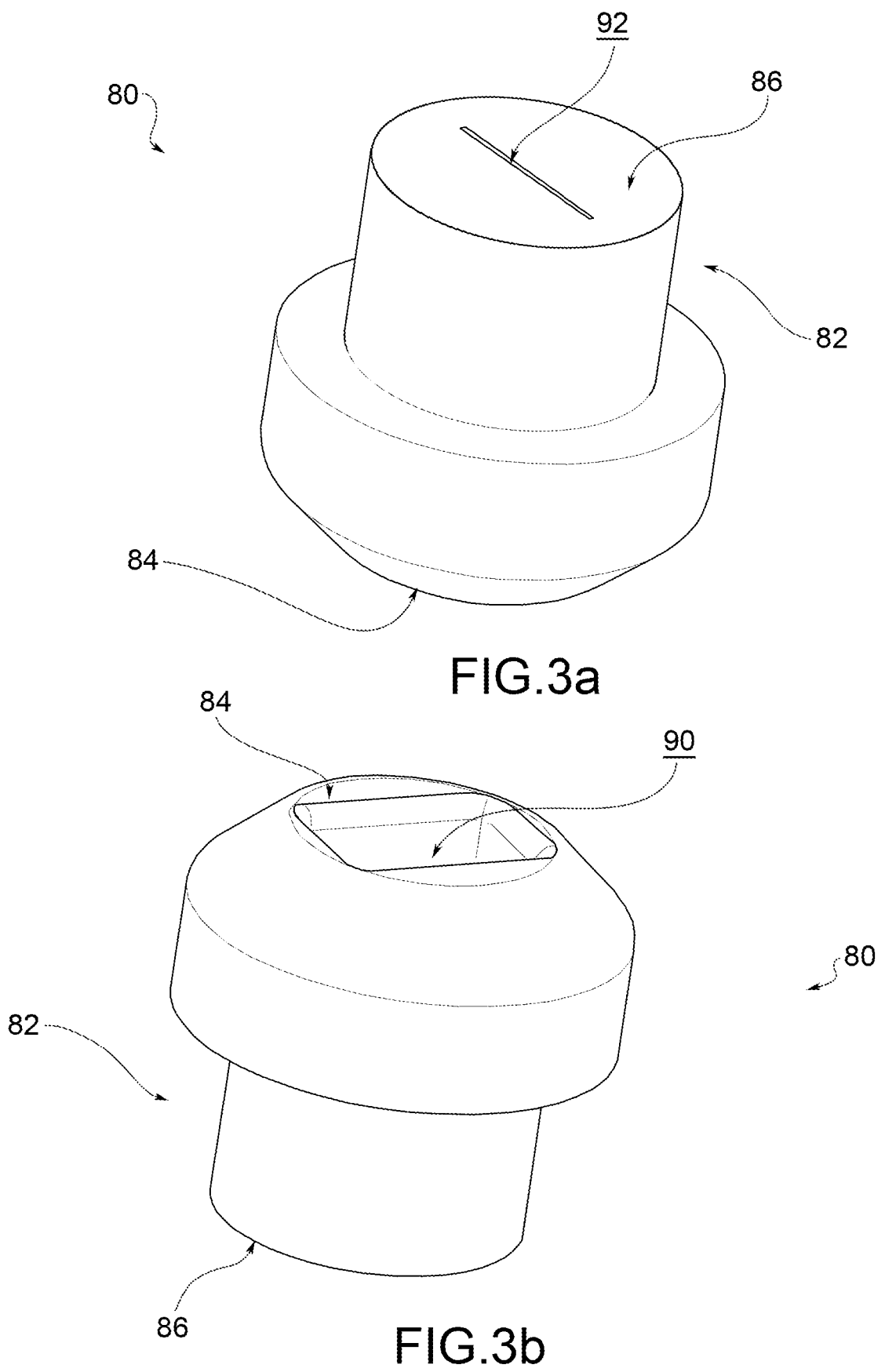
FIGS. 3a and 3b show a valve of the foaming device according to an embodiment of the present invention.
Figures 4A, 4B, 4C:
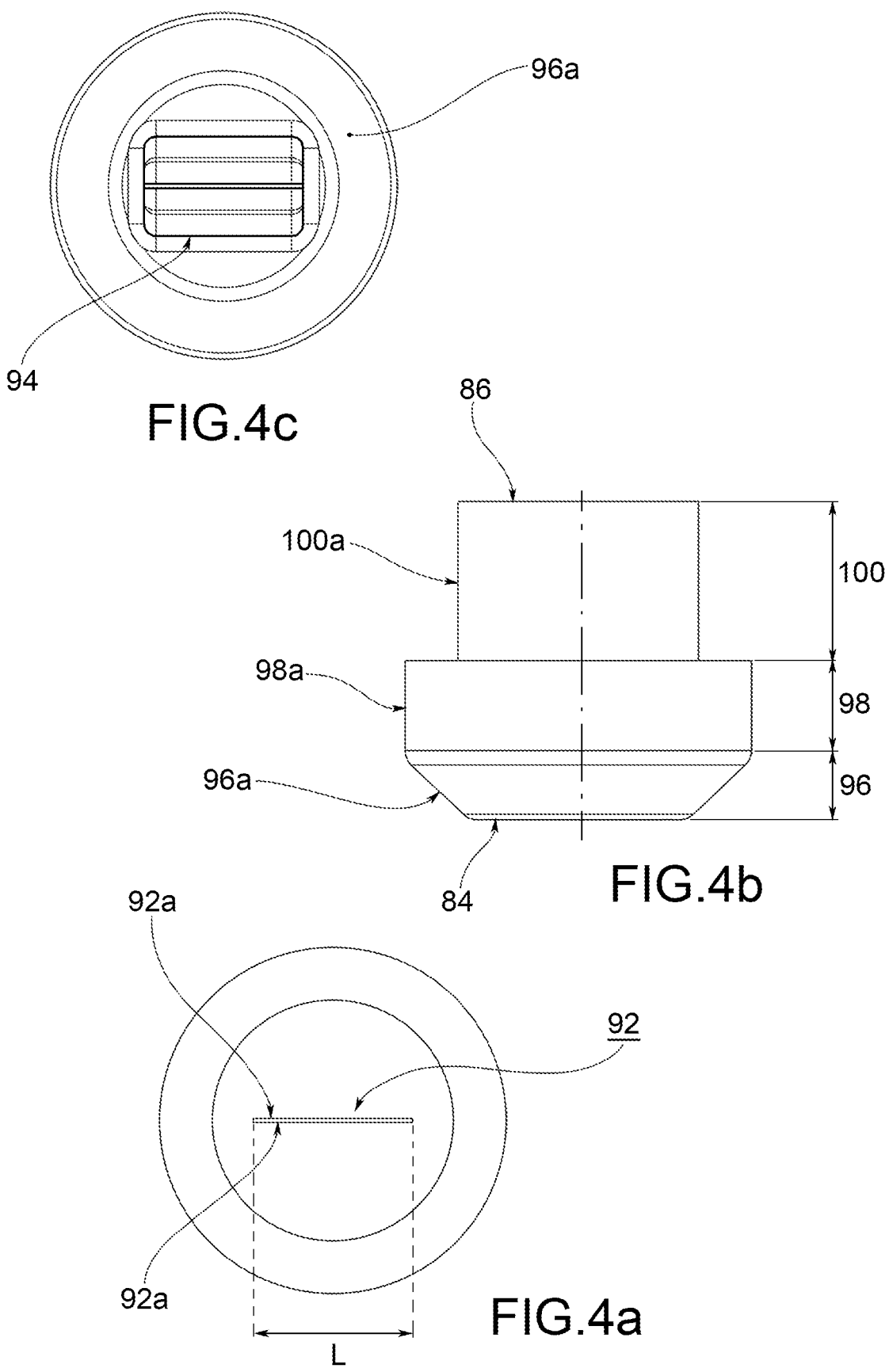
FIGS. 4a to 4e show flat views of the valve in FIGS. 3a and 3b.
Figure 4D:
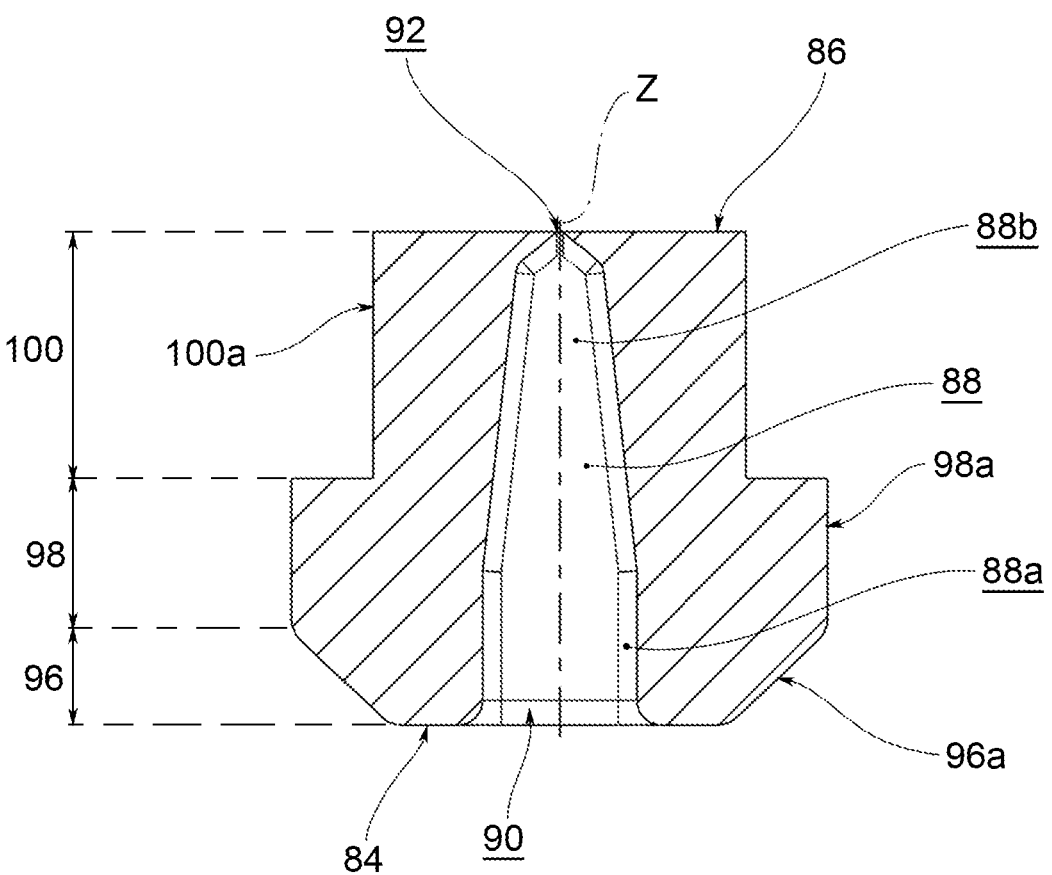
Figure 4E:
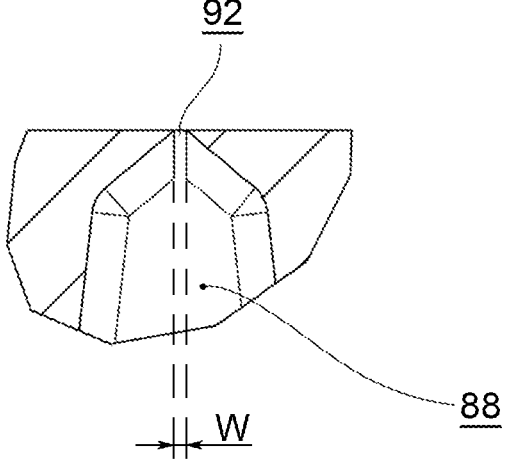

With reference to FIG. 1, a coffee maker 1 comprises a boiler 2 consisting of container, preferably in one piece, generally made of steel or aluminum.

Boiler 2 comprises a bottom 4 intended to rest on a cooking surface, e.g., a gas ring, a hotplate, an induction surface, and the like.

According to an embodiment, the boiler bottom 4, typically if it is made of aluminum, comprises a plurality of inserts made of ferromagnetic material, e.g., steel, to allow using the coffee maker on an induction surface.

Boiler 2 further comprises an annular boiler wall 6, protruding from bottom 4, ending on the top with a boiler mouth 8, conventionally provided with a thread 10.

The coffee maker 1 preferably comprises a safety valve 12, preferably inserted through the thickness of the boiler wall 6.

For example, the safety valve is made according to document EP-A1-1797360 to the Applicant, the contents of which are expressly incorporated herein.

Boiler 2 therefore has an inner boiler chamber 14 delimited by the boiler bottom 4 and by the boiler wall 6.

The coffee maker 1 further comprises a dosing device funnel 20, which can be housed in the boiler chamber 14, typically carried by the edge of the boiler mouth 8.

The dosing device funnel 20 comprises a dosing device conduit 22 for the rising of the water from the boiler chamber 14, which leads into a dosing device compartment 24 intended to contain the coffee powder.

The dosing device conduit 22 and the dosing device compartment 24 are preferably separated by a dosing device filter 26, generally consisting of a perforated sheet, provided to prevent the coffee powder from falling through the dosing device conduit 22.

The coffee maker 1 further comprises a receptacle 30 for collecting the percolated beverage, intended to be coupled to the boiler 2.

Receptacle 30 comprises a coupling region 32 for the mechanical engagement with the boiler 2. For example, said coupling region 32 consists of an annular coupling wall 34, for example internally threaded, intended to be screwed to mouth 8 of the boiler.

Receptacle 30 further comprises a receptacle bottom 36, from which said coupling region 32 preferably protrudes downwards, and an annular receptacle wall 38, which protrudes on the top from the receptacle bottom 36, thus delimiting a receptacle chamber 40 for collecting the percolated beverage.

The receptacle wall 38 preferably has a shaped portion so as to form a spout 39 for pouring the beverage contained in the receptacle chamber 40.

Receptacle 30 further comprises a funnel 42 vertically protruding from the receptacle bottom 36, which is open on the bottom by means of a funnel inlet 44 which opens through the receptacle bottom 36, and on the top by means of a funnel mouth 46.

The funnel inlet 44 is in communication with the funnel mouth 46 by means of an inner funnel conduit 45.

Preferably, funnel 42 has a necking 43 along the funnel conduit 45, the necking for example being made by an annular protrusion which narrows the passage section of the percolated beverage.

Receptacle 30 is preferably made by a body in one piece, generally made of steel or aluminum.

According to one embodiment variant, the receptacle is made of ceramic or glass and has inserts for the engagement with boiler 2.

Coffee maker 1 preferably comprises a beverage filter 50 placed between the dosing device compartment 24 and the funnel inlet 44, for example consisting of a perforated sheet, for filtering the percolated beverage before it travels in funnel 42.

Said beverage filter 50 is preferably held in place by a seal 52 made of rubber, e.g., NBR, EPDM or silicone.

Moreover, the coffee maker 1 preferably comprises a handle 60 applied to receptacle 30, and a cover 65 hinged to receptacle 30 and rotatable to inspect the receptacle chamber 40; cover 65 preferably does not cover spout 39 in the closing configuration.

According to the invention, the coffee maker 1 comprises a foaming device 70 applied to the top of funnel 42.

The foaming device 70 comprises a valve 80, preferably made in one piece, made of polymer material adapted to come into contact with food, e.g., natural silicone.

Valve 80 comprises a valve body 82 which extends along a body axis Z between a lower end 84 and an upper end 86.

The valve body 82 internally has a conduit 88 having extension along the body axis Z, between the lower end 84, where an inlet mouth 90 opens, and the upper end 86, where an outlet mouth 92 opens.

Conduit 88 preferably is tapered from the inlet mouth 90 towards the outlet mouth 92.

Considering valve 80 in itself, that is in a rest condition in which it is not applied to the coffee maker, the outlet mouth 92 has the shape of a long and narrow slit; in other words, the outlet mouth 92 has a shape defined by two main dimensions: a length L and a width W, in which length L is much greater than width W.

For example, a characteristic L/W ratio is defined; according to a preferred embodiment, said characteristic ratio is between 10 and 100, preferably between 20 and 80, even more preferably between 30 and 50. For example, said characteristic ratio is equal to 40.

Moreover, the inlet mouth 90 preferably has quadrangular shape, e.g., rectangular, with rounded corners, which inlet mouth is oriented so that the length of the outlet mouth 92 corresponds to the largest size of the rectangle.

Conduit 88 preferably has a first stretch 88a, having said inlet mouth 90, with constant cross section, and a second stretch 88b, which goes from the first stretch 88a to the outlet mouth 92, with decreasing section.

According to a preferred embodiment, externally the valve body 82 has:

a first portion 96 having said inlet mouth 90, with frustoconical outer surface 96a;

a second portion 98 having cylindrical outer surface 98a, with diameter equal to the largest diameter of the frustoconical surface 96a; and a third portion 100 having cylindrical outer surface 100a, with reduced diameter as compared to that of the second portion 98.

The foaming device 70 preferably comprises a tang 120, preferably made in one piece, e.g., made of steel.

Tang 120 extends along a tang axis X, between an engagement end 122 and a free end 124.

Tang 120 comprises, at the engagement end 122, an engagement portion 125 provided with a mouth 126 for the application of valve 80.

In particular, the third portion 100 of the valve body 82 is forcefully inserted into the mouth 126 of tang 120, thus ensuring the connection between valve 80 and tang 120.

The forceful insertion of the valve 80 of tang 120 causes a necking of the outlet mouth 92 so that the walls 92a delimiting it in the direction of length L mutually approach one another, further reducing the passage section, or even coming into contact with one another, thus closing the slit.

In other words, in a rest condition in which valve 80 is not applied to tang 120 (or in an embodiment variant, to funnel 42), said outlet mouth 92 has a passage section at rest, while in a mounting condition in which valve 80 is applied to tang 120 (respectively, in an embodiment variant, to funnel 42), said outlet mouth 92 is deformed and has a reduced working passage section as compared to the passage section at rest.

Tang 120 further has an inner dispensing conduit 128 which puts mouth 126 in connection with the external environment.

Moreover, the foaming device 70 preferably comprises a sealing ring 130 which is externally fitted at mouth 126.

Once valve 80 is applied to tang 120 (and the sealing ring 130 is mounted, when provided), the foaming device 70 is applied to funnel 42 of the coffee maker 1; in particular, the engagement portion 125 of tang 120 is applied to the funnel mouth 46, for example by screwing.

Valve 80, carried by tang 120 at the same engagement portion 125, is therefore placed in funnel 42, downstream of necking 43, which prevents the detachment thereof from the tang.

During the normal use of the coffee maker 1, the percolated beverage rising from funnel 42 enters valve 80 through the inlet mouth 94 and is conveyed from conduit 88 towards the outlet mouth 92.

A localized overpressure is created before the beverage passes in the dispensing conduit 128 of tang 120 and is collected in receptacle 30 both if the outlet mouth 92 is closed by virtue of the necking undergone due to the application to tang 120 and if it has reduced dimensions as compared to those of the resting condition.

Such an overpressure and the resulting laminar flow towards the dispensing conduit 128 create a dense foam which enhances the aromatic qualities of the beverage.

According to one embodiment variant of the invention, the foaming device consists of valve 80 alone, suitably applied to the funnel mouth, for example by insertion into the funnel itself through the funnel mouth 46.

According to a further embodiment variant again, the outlet mouth consists of a plurality of micro-holes which undergo necking due to the effect of the necking due to application of the valve to the tang or directly to the funnel.

It is apparent that those skilled in the art can make changes to the coffee maker and the foaming device described above in order to meet contingent needs, all included within the scope of protection as defined by the following claims.

The invention claimed is:

1. A coffee maker comprising a funnel ending with a funnel mouth and a foaming device applied to the funnel mouth, wherein said foaming device comprises a valve made of deformable material provided with an outlet mouth towards which an exiting percolated beverage is channeled, wherein in a rest condition, in which the valve does not cooperate with the funnel, said outlet mouth has a rest passage section, and in a mounting condition, in which the valve cooperates with the funnel, said outlet mouth is deformed and has a working passage section, reduced as compared to the rest passage section, wherein said outlet mouth is formed in a portion of the valve, and in the mounting condition said portion of the valve is subject to a compression that causes deformation of the outlet mouth, the foaming device comprises a tang provided with an engagement portion provided with a mouth for application of the valve, and wherein the portion of the valve is forcefully inserted into the mouth of the tang, causing a necking of the outlet mouth and reducing the working passage section.

2. The coffee maker of claim 1, wherein the outlet mouth has a shape defined by a length and a width, wherein the length is much greater than the width and wherein a characteristic ratio being defined as a ratio of the length to the width, said characteristic ratio is between 10 and 100.

3. The coffee maker of claim 2, wherein said characteristic ratio is between 20 and 80.

4. The coffee maker of claim 2, wherein said characteristic ratio is between 30 and 50.

5. The coffee maker of claim 2, wherein said characteristic ratio is equal to 40.

6. The coffee maker of claim 1, wherein the valve is made in one piece.

7. The coffee maker of claim 6, wherein the valve is made of natural silicone.

8. The coffee maker of claim 1, wherein the engagement portion is applied to the funnel.

9. The coffee maker of claim 8, wherein the engagement portion is applied to the funnel by screwing.

10. The coffee maker of claim 8, wherein the valve, applied to the funnel, is arranged downstream of a necking of the funnel.

11. The coffee maker of claim 1, wherein the valve comprises an inner conduit ending with said outlet mouth, said inner conduit being tapered towards the outlet mouth.

12. The coffee maker of claim 1, wherein said outlet mouth consists of a plurality of holes.

* * * * *